United States Patent [19]
Kooima et al.

[11] Patent Number: 6,092,750
[45] Date of Patent: Jul. 25, 2000

[54] AGRICULTURAL MIXER AUGER CUTTING BLADE

[76] Inventors: John C. Kooima, 2638 310th St.;
Phillip G. Kooima, 2634 310th St.,
both of Rock Valley, Iowa 51247

[21] Appl. No.: 09/321,167

[22] Filed: May 27, 1999

[51] Int. Cl.[7] .............................. B02C 18/14; B02C 18/18
[52] U.S. Cl. .................................. 241/101.76; 241/260.1; 241/292.1; 241/300; 241/605
[58] Field of Search ........................... 241/101.76, 260.1, 241/292.1, 605, 300, 291

[56] References Cited

U.S. PATENT DOCUMENTS

| | | | |
|---|---|---|---|
| 1,408,850 | 3/1922 | Webb | 241/292.1 |
| 2,183,114 | 12/1939 | Bonapace | 241/292.1 |
| 2,934,120 | 4/1960 | Schnell | 241/292.1 |
| 4,068,688 | 1/1978 | Benson . | |
| 4,205,564 | 6/1980 | Kolb et al. . | |
| 4,690,024 | 9/1987 | Chaconas . | |
| 4,760,967 | 8/1988 | Bendickson | 241/101.74 |
| 4,770,253 | 9/1988 | Hallissy et al. . | |
| 5,020,918 | 6/1991 | Faccia . | |
| 5,074,623 | 12/1991 | Hedlund et al. . | |
| 5,082,188 | 1/1992 | Urich . | |
| 5,193,280 | 3/1993 | Jackson . | |
| 5,331,876 | 7/1994 | Hayden, Sr. . | |
| 5,351,595 | 10/1994 | Johnston . | |
| 5,427,000 | 6/1995 | Hellbergh . | |
| 5,456,416 | 10/1995 | Hartwig | 241/260.1 |
| 5,553,937 | 9/1996 | Faccia . | |
| 5,613,537 | 3/1997 | Gassiott . | |
| 5,615,839 | 4/1997 | Hartwig | 241/260.1 |
| 5,647,665 | 7/1997 | Schuler . | |
| 5,772,131 | 6/1998 | Dal Maso | 241/46.17 |
| 5,823,449 | 10/1998 | Kooima et al. . | |
| 6,000,649 | 12/1999 | Loppoli | 241/260.1 |

*Primary Examiner*—John M. Husar

[57] ABSTRACT

An agricultural mixer auger cutting blade for providing a durable cutting blade with improved impact and wear resistance. The agricultural mixer auger cutting blade includes a plate having a leading edge, and a back edge. The leading edge of the plate has a plurality of spaced apart cutouts therein forming a row of alternating seats and extents extending along the leading edge of the plate. A plurality of cutting teeth are provided each having an arcuate front cutting edge and a back edge. Each of the seats receives therein a corresponding associated cutting tooth therein such that the front cutting edge of each cutting tooth faces in an outwardly direction from the leading edge of the plate. Each of the cutting teeth is coupled to the plate in the associated seat.

27 Claims, 3 Drawing Sheets

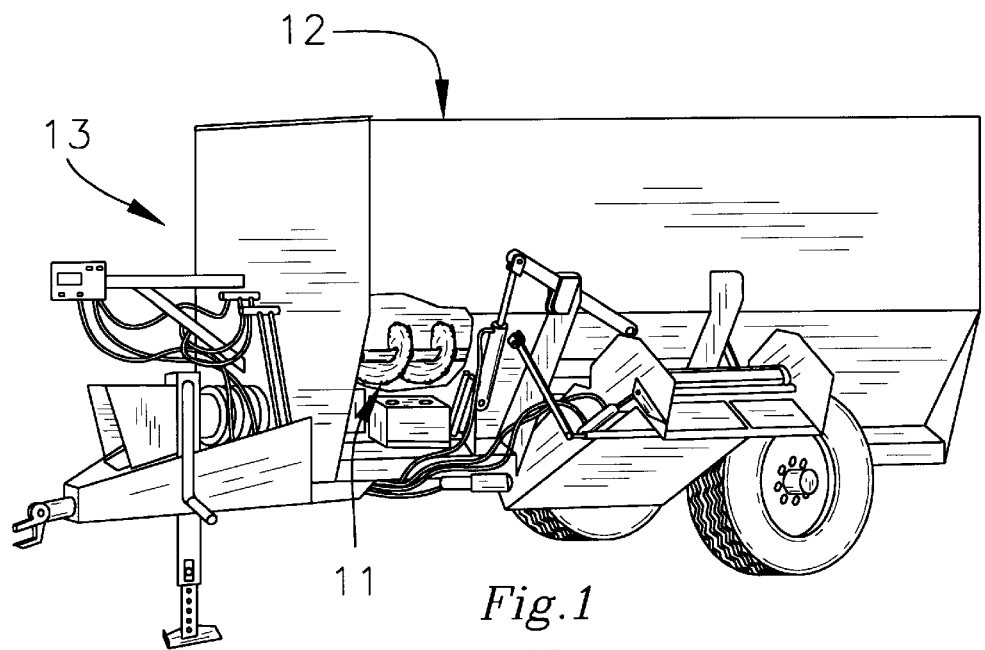
Fig.1
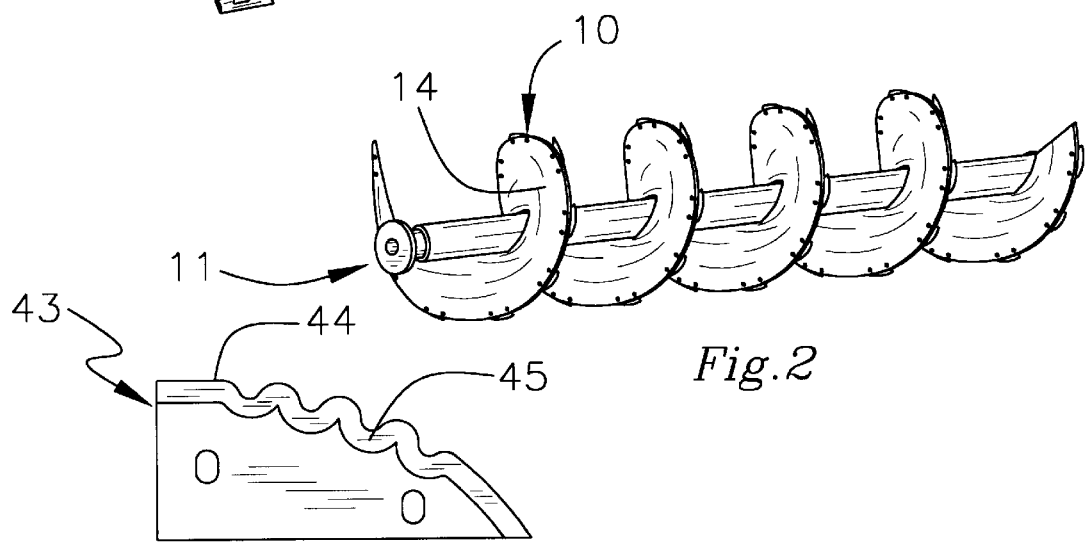
Fig.2
Fig.10
PRIOR ART

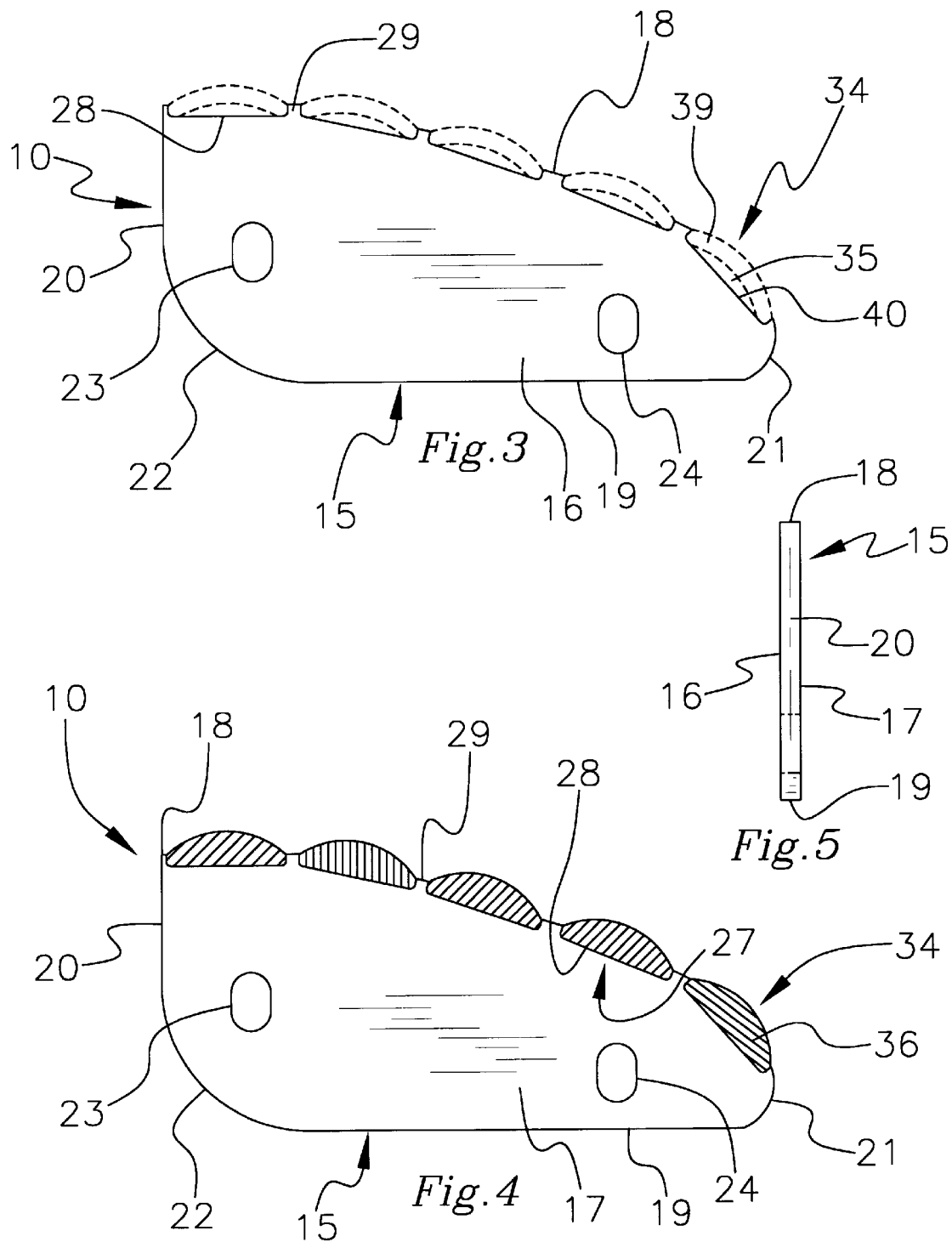

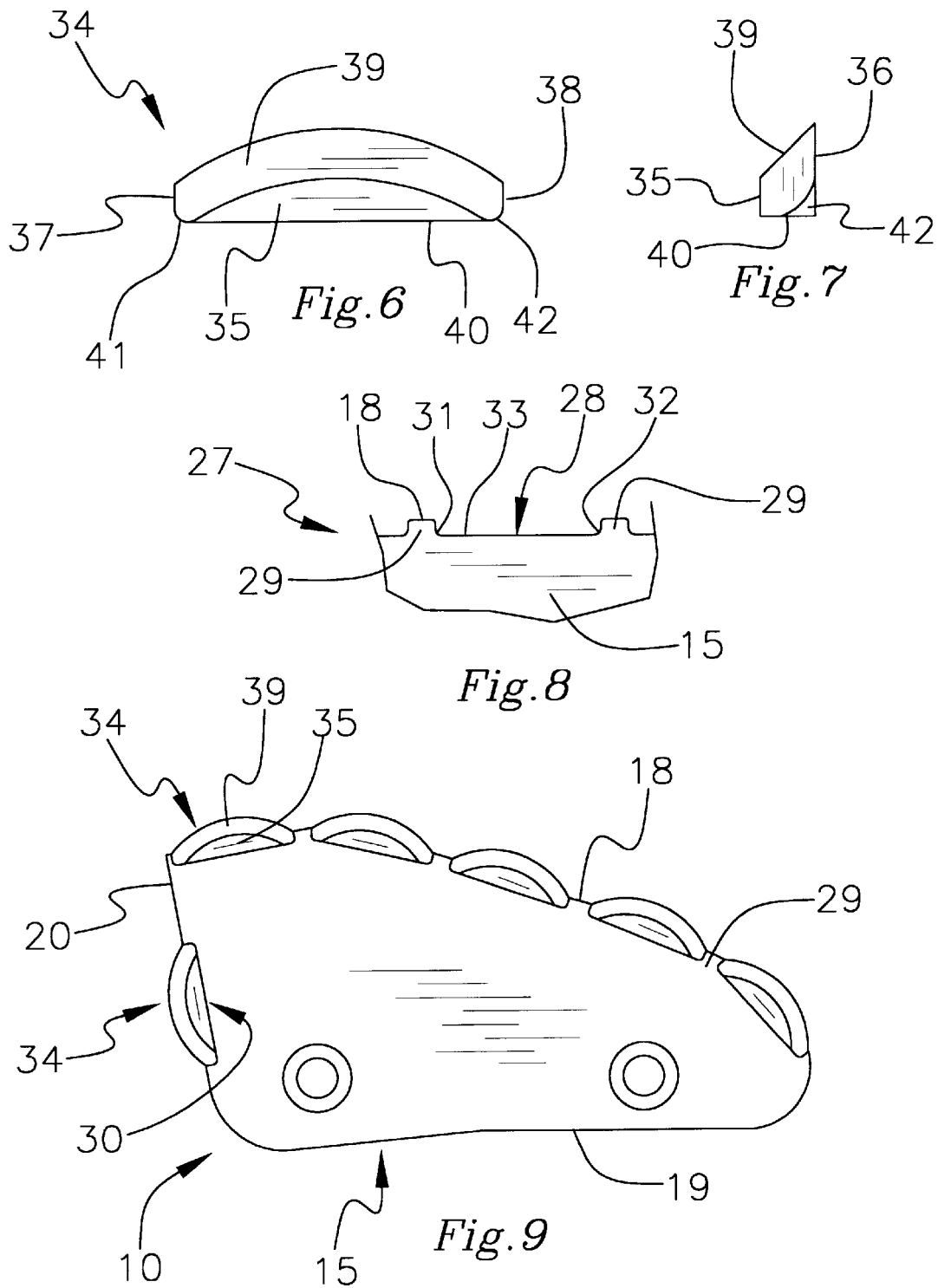

AGRICULTURAL MIXER AUGER CUTTING BLADE

BACKGROUND OF THE INVENTION

1. Field of the Invention

The present invention relates to cutting tools, and in particular cutting tools for agricultural mixers, and more particularly pertains to a new agricultural mixer auger cutting blade for providing a durable cutting blade with improved impact and wear resistance.

2. Description of the Prior Art

The use of cutting tools, and in particular cutting tools for agricultural mixers, is known in the prior art.

Agricultural mixers which chop and mix grains for use as livestock feed have been manufactured and used for several years in the United States and Europe. These mixers are predominantly used for chopping relatively soft materials such as grains. Conventional blades employed in these mixers are typically constructed from a single piece of steel having a uniform material character throughout the entire blade. Such conventional blade construction, even when used for chopping and mixing grain and other relatively soft materials, has a relatively limited life span of only about 200 hours of operation before requiring replacement.

Relatively harder materials, such as, for example, used turkey bedding straw (and the turkey dung mixed in with the bedding straw) have been increasingly added to grain placed in the mixer for chopping to enrich the nutritional mineral levels in the mixture which is used as a livestock feed. Some of the minerals in the turkey dung can cause portions of the turkey bedding straw to harden to a hardness that is substantially harder than the grains placed in the mixer. In fact, the hard portions of the straw can become harder than concrete or volcanic ash, which makes the turkey bedding straw significantly more abrasive on the blades of a mixer than the much softer grains chopped in the mixer. Conventional blades used in mixers have exhibited a significantly reduced life span when hard materials such as turkey bedding straw is chopped in the mixer. The life span for blades used in mixers where a significant amount of used turkey bedding straw is mixed is substantially reduced, to about 30 hours of operation, before the blades require replacement. This shortened life span makes operation of the mixer much less economical.

The blade of the invention described in our U.S. Pat. No. 5,823,449 utilizes carbide cutting teeth inserts for increasing the life span of the blade. The blade described in U.S. Pat. No. 5,823,449 is highly suitable for use in devices where the cutting edges and surfaces of the cutting teeth are moved in a direction that is substantially perpendicular to the orientation of the cutting edge of the blade. One example of such a device is on a "vertical" livestock feed mixer, where the axis of the mixer auger is substantially vertically oriented. As a result of this perpendicular movement, the cutting edges of the cutting teeth primarily strike the material to be mixed in a direction that is substantially perpendicular to the cutting edge, and the impact of the cutting is transferred to the blade by the cutting teeth in a direction substantially perpendicular to the edge of the blade. In the case of our invention described in U.S. Pat. No. 5,823,449, the impact of cutting is transferred from the cutting teeth insert in a direction perpendicular into the insert mounting surface on the blade.

Other types of devices, such as, for example, "horizontal" livestock feed mixers, move the blades in a manner such that the cutting edge of each of the cutting teeth does not strike the material at an orientation perpendicular to the cutting edge. Instead, the cutting edge of the cutting teeth strikes the material at an angle that varies significantly from the perpendicular to the cutting edge, in what may be characterized as a "slashing" orientation. As a result of this movement, a significant component of the impact of the material against the cutting edge is directed in a direction parallel to the cutting edge, rather than a direction primarily perpendicular to the cutting edge. The magnitude of the impact forces applied parallel to the cutting edge is further increased by the design of some blades where the cutting edge has an undulating or scalloped shape with alternating peaks and valleys. The direction of the forces applied to the cutting edge of these blades thus presents substantially different problems from the devices where the material is struck in a primarily perpendicular manner. The transfer of the impact force from the teeth inserts to the blade at a non-perpendicular angle to the blade surface changes the character of the forces on the mounting between the insert and the blade. As a result, the manner of mounting the cutting teeth inserts on the blade as described in U.S. Pat. No. 5,823,449 is not most ideally suited for use in devices where the cutting edge is not moved in a direction substantially perpendicular to the cutting edge.

In these respects, the agricultural mixer auger cutting blade according to the present invention substantially departs from the conventional concepts and designs of the prior art, and in so doing provides an apparatus primarily developed for the purpose of providing a durable cutting blade with improved impact and wear resistance.

SUMMARY OF THE INVENTION

In view of the foregoing disadvantages inherent in the known types of cutting tools, and in particular cutting tools for agricultural mixers now present in the prior art, the present invention provides a new agricultural mixer auger cutting blade construction wherein the same can be utilized for providing a durable cutting blade with improved impact and wear resistance.

The general purpose of the present invention, which will be described subsequently in greater detail, is to provide a new agricultural mixer auger cutting blade apparatus and method which has many of the advantages of the cutting tools, and in particular cutting tools for agricultural mixers mentioned heretofore and many novel features that result in a new agricultural mixer auger cutting blade which is not anticipated, rendered obvious, suggested, or even implied by any of the prior art cutting tools, and in particular cutting tools for agricultural mixers, either alone or in any combination thereof.

To attain this, the present invention generally comprises a plate having a leading edge, and a back edge. The leading edge of the plate has a plurality of spaced apart cutouts therein forming a row of alternating seats and extents extending along the leading edge of the plate. A plurality of cutting teeth are provided each having an arcuate front cutting edge and a back edge. Each of the seats receives therein a corresponding associated cutting tooth therein such that the front cutting edge of each cutting tooth faces in an outwardly direction from the leading edge of the plate. Each of the cutting teeth is coupled to the plate in the associated seat.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is an object of the present invention to provide a new agricultural mixer auger cutting blade which may be easily and efficiently manufactured and used.

It is a further object of the present invention to provide a new agricultural mixer auger cutting blade which is of a durable and reliable construction.

Another object of the present invention is to provide a new agricultural mixer auger cutting blade for providing a durable cutting blade with improved impact and wear resistance, especially in those applications where the force of the impact is transferred to the blade in a direction that substantially deviates from the perpendicular to the cutting edge.

Yet another object of the present invention is to provide a new agricultural mixer auger cutting blade which includes a plate having a leading edge, and a back edge. The leading edge of the plate has a plurality of spaced apart cutouts therein forming a row of alternating seats and extents extending along the leading edge of the plate. A plurality of cutting teeth are provided each having an arcuate front cutting edge and a back edge. Each of the seats receives therein a corresponding associated cutting tooth therein such that the front cutting edge of each cutting tooth faces in an outwardly direction from the leading edge of the plate. Each of the cutting teeth is coupled to the plate in the associated seat.

Still yet another object of the present invention is to provide a new agricultural mixer auger cutting blade that has a prolonged life. Mixer blades made of steel have the advantage of being relatively inexpensive, but also the disadvantage of wearing out extremely rapidly. Accordingly, once worn out, the steel blades must be replaced which, in addition to being time consuming, also results in downtime for the equipment. Thus, the present invention provides a mixer blade with an improved life span which resultantly reduces the occurrence of such replacement and eliminates the associated problems.

Even still another object of the present invention is to provide a new agricultural mixer auger cutting blade that is adapted to more adequately address the harsh conditions often encountered during the mixing of agricultural feed including, more specifically, low revolution mixing (1 to 40 RPM range).

Still yet another object of the present invention is to provide a new agricultural mixer auger cutting blade that lasts at least about five times longer (on average) than blades of conventional construction when used for chopping used turkey bedding straw. Blades employing my invention also exhibit this significantly longer life span when used for chopping only softer materials. This substantial increase in durability results in a significant labor savings. Additionally, use of blades incorporating my invention saves the amount of labor time spent replacing and sharpening the blade as compared to the labor required for replacing and sharpening conventional blades.

Even still another object of the present invention is to provide a new agricultural mixer auger cutting blade that allows a user to manufacture a plate that is thinner than the plate portion of prior art unitary body cutting blades to help keep the overall weight of the cutting blade down.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic breakaway perspective view of an agricultural mixer with an auger having a plurality of cutting blades according to the present invention thereon.

FIG. 2 is a schematic perspective view of an auger having a plurality of the cutting blades thereon.

FIG. 3 is a schematic plan view of one face of the present invention.

FIG. 4 is a schematic plan view of the other face of the present invention.

FIG. 5 is a schematic side view of the present invention.

FIG. 6 is a schematic plan view of a cutting tooth of the present invention.

FIG. 7 is a schematic end view of a cutting tooth of the present invention.

FIG. 8 is a schematic plan view of a cutout of the leading edge of the present invention.

FIG. 9 is a schematic plan view of another embodiment of the present invention having a cutting tooth on the side edge of the plate.

FIG. 10 is a schematic plan view of a prior art cutting blade 43 made of a single piece of material and having a leading edge 44 with a scalloped portion 45.

DESCRIPTION OF THE PREFERRED EMBODIMENT

With reference now to the drawings, and in particular to FIGS. 1 through 10 thereof, a new agricultural mixer auger cutting blade embodying the principles and concepts of the present invention and generally designated by the reference numeral 10 will be described.

As best illustrated in FIGS. 1 through 10, the agricultural mixer auger cutting blade 10 generally comprises a plate having a leading edge, and a back edge. The leading edge of the plate has a plurality of spaced apart cutouts therein forming a row of alternating seats and extents extending along the leading edge of the plate. A plurality of cutting teeth are provided each having an arcuate front cutting edge and a back edge. Each of the seats receives therein a associated cutting tooth therein such that the front cutting edge of each cutting tooth faces in an outwardly direction from the leading edge of the plate. Each of the cutting teeth is coupled to the plate in the associated seat.

With reference to FIGS. 1 and 2, in use, the cutting blade 10 is designed for an auger 11 rotatably mounted in a mixing bin 12 of an agricultural mixer 13 used for chopping and mixing grains for use as livestock feed. The auger preferably has a constant diameter corkscrew shaped fin 14 and a plurality of the cutting blades mounted to an outer periphery of the fin in a spaced relationship along the length of the auger.

In closer detail, each of the cutting blades 10 comprises a preferably generally triangular and substantially planar plate 15 having a pair of substantially parallel and substantially planar faces 16, 17, a generally arcuate leading edge 18, a preferably generally straight back edge 19, and preferably a generally straight side edge 20 extending between the leading edge and the back edge of the plate. The plate also preferably has a rounded first corner 21 connecting the leading edge and the back edge of the plate together and a rounded second corner 22 connecting the side edge and the back edge of the plate together. In one preferred embodiment, as illustrated in FIG. 4, the rounded second corner of the plate has a radius of curvature greater than a radius of curvature of the rounded first corner of the plate so that the arc of the rounded second corner is greater than the arc of the rounded first corner.

The plate has a spaced apart pair of mounting holes 23, 24 therethrough extending between the faces of the plate. In one preferred embodiment, the mounting holes have a generally oblong outer perimeter. In another preferred embodiment illustrated in FIG. 9, the mounting holes 25, 26 each have a generally circular beveled outer perimeter. In use, the mounting holes of the plate each are designed for extending a fastener therethrough to mount the plate to a portion of the corkscrew-shaped fin of an auger such that the leading edge of the plate faces radially outwards from an outer perimeter of the fin of the auger.

The leading edge of the plate has an outwardly facing convexity. The leading edge of the plate has a plurality of spaced apart generally rectangular U-shaped cutouts 27 therein forming a row of alternating seats 28 and extents 29 extending along the leading edge of the plate between the side edge and the rounded first corner of the plate. Preferably, the row of alternating seats and extents terminate at an extent at both ends of the row so that an extent is positioned adjacent the side edge of the plate and another extent is positioned adjacent the rounded first corner of the plate. Ideally, the extents are spaced apart at generally equal intervals in the row along the leading edge of the plate. Optionally, as illustrated in FIG. 9, the side edge of the plate may also have a generally rectangular U-shaped cutout 30 therein forming a side seat for providing an additional cutting surface.

With reference to FIG. 8, each of the seats has a generally rectangular U-shaped periphery comprising a spaced apart pair of side portions 31, 32 and a back portion 33 connecting the side portion of the respective seats together. The side portions of each of the seats are preferably extend generally perpendicular to the back portion of the seat. Each of the seats has a width defined between the side portions of the respective seat and a depth defined outwardly from the back portion of the respective seat to a line extending across the respective seat between the leading edge portions of the adjacent extents. Preferably, the widths of the seats are about equal to one another. Ideally, the depths of the seats are about equal to one another. In a preferred embodiment, the width of each seat is greater than the depth of the respective seat. Even more preferably, the width of each seat is at least about five times the depth of the respective seat. Ideally, the width of each seat is at least about thirteen times the depth of the respective seat to provide an optimal ratio for holding of a cutting tooth securely in the seat without significantly interfering with the cutting action. In an ideal illustrative embodiment, the width of each seat is about 1.5 inches, and the depth of each seat is about 0.15 inches.

The cutting blade also includes a plurality of cutting teeth 34 each comprising (as illustrated in FIG. 6) a pair of substantially parallel and substantially planar faces 35, 36, a pair of opposite ends 37, 38, and an arcuate front cutting edge 39 and a substantially straight back edge 40 extending between the ends of the respective cutting tooth.

Each of the seats receives an associated cutting tooth therein including the side seat of the side edge in the embodiment illustrated in FIG. 9. In a preferred embodiment, one of the faces of each cutting tooth is generally coplanar with one of the faces of the plate and the other face of each cutting tooth is generally coplanar with the other face of the plate to produce a cutting edge that retains a degree of sharpness even as the tooth surface gradually wears away.

The back edge of each cutting tooth is coupled to the back portion of the associated seat. One of the ends of each cutting tooth is coupled to one of the side portions of the associated seat. The other end of each cutting tooth is coupled to the other of the side portions of the associated seat. In one preferred embodiment, the back edge and ends of each cutting tooth are bonded to the corresponding back and side portions of the associated seat by a metal composition. In an even more preferred embodiment, the back edge and ends of each cutting tooth are brazed to the corresponding back and side portions of the associated seat so that brazing couples the back edge and ends of each cutting tooth to the corresponding back and side portions of the associated seat. This type of coupling provides a strong coupling between each cutting tooth and the associated seat to optimally resist the breaking off of the cutting teeth from the plate by shear forces acting at the bond between the tooth and the plate.

With reference to FIGS. 6 and 7, preferably, the back edge of each cutting tooth extends substantially perpendicular to the faces of the respective cutting tooth. The ends of each cutting tooth preferably extend generally perpendicular to the back cutting edge of the respective cutting tooth. Ideally, each of the ends of each cutting tooth has a rounded corner 41, 42 adjacent the back edge of the respective cutting tooth. The rounded corners help direct bonding material or brazing material between the cutting teeth and the seats. In use, the side and back portions of the seats provide an optimal amount of surface area to contact the ends and back edge of the cutting teeth to help bond the cutting teeth to the plate so that cutting teeth are more securely held to the plate than if the cutting teeth were simply coupled to a plate with a leading edge without the cutouts.

The extents of the plate forming the seats also provide additional structural strength to the coupling of the cutting teeth to the plate for helping resist lateral shear forces applied to the ends of the cutting teeth that in an embodiment lacking cutouts could be sufficient to shear or break the cutting teeth off of the plate. The benefit of the extents is especially significant for devices where the cutting teeth of the blade do not strike the material to be mixed in a direction perpendicular to the cutting edge 39. Each of the extents has a width defined between adjacent seats. Preferably, the widths of the extents are generally equal to one another. In an ideal illustrative embodiment, the width of each extent is about 0.15 inches to about 0.25 inches. In use, the extents also help prevent clogging between cutting teeth of cut grain particulate which would otherwise diminish the effective cutting area of the front cutting edges.

The front cutting edge of each cutting tooth has a convexity facing outwards in a direction from the leading edge of the plate. As best illustrated in FIG. 7, the front cutting edge of each cutting tooth is preferably extended at an acute angle from a first of the faces of the respective cutting tooth and an obtuse angle from a second of the faces of the respective cutting tooth. Ideally, the acute angle of the front cutting edge of each cutting tooth is about 45 degrees for providing an optimal cutting angle between the front cutting end and the first face of the seat and the obtuse angle of the front cutting edge of each cutting tooth is about 135 degrees for efficiently cutting feed material with the front cutting edge.

The front cutting edge of each cutting tooth has an outermost apex located adjacent the first face of the respective cutting edge. Preferably, the apexes of the front cutting edges of the cutting teeth define an arc, and the arc is generally uniformly spaced apart from an arc formed by the leading edge of the plate to help insure optimal cutting of material with the front cutting edges.

Each of the cutting teeth has a thickness defined between the faces of the respective cutting tooth, a length defined between the ends of the respective cutting tooth and a width defined between the back edge and an outermost apex of the front cutting edge adjacent the first face of the respective cutting edge. Preferably, each of the cutting teeth is of generally equal size to the other teeth. In one preferred embodiment, the thickness of each cutting tooth is about equal to the thickness of the plate. Also preferably, the length of each cutting tooth is at least about three times the width of the respective cutting tooth. In an ideal illustrative embodiment, the thickness of each cutting tooth is about 0.25 inches, the length of each cutting tooth is about 1.5 inches, and the width of each cutting tooth is about 0.4 inches.

Preferably, each of the cutting teeth comprises a material has a hardness significantly greater than the material of the plate. In one preferred embodiment, the cutting teeth and plate each comprise an iron material with the composition of the iron of the cutting teeth having a greater carbon content than the composition of the iron of the plate. This way, the cutting teeth have a greater hardness than the plate so that a lower (and therefore typically less expensive) grade of steel may be used for the plate than for the cutting teeth. This also helps to minimize overall cost of the cutting blade while maintaining durability against impact and wear to the parts that are most exposed to impact and wear (i.e., the cutting teeth). In one ideal embodiment, the cutting teeth each have a composition by weight of about 90 percent tungsten carbide and about 10 percent cobalt for providing an optimal durability to each of the cutting teeth. In this ideal embodiment, the relative plate "softness" of the material allows the plate to flex to fit to the contour of the fin of the auger when it is mounted to the fin.

Ideally, the plate has a uniform thickness defined between the faces of the plate. In use, the cutouts also allow the plate and cutting teeth to be made thinner (reducing for example a ¾ inch plate thickness to a thickness of between about ⅝ inch to about ½ inch) than traditional single bodied cutting blades.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A cutting blade, comprising:
   a plate having a leading edge, a back edge, and a side edge;
   said leading edge of said plate having a plurality of spaced apart cutouts therein forming a row of alternating seats and extents extending along said leading edge of said plate;
   a plurality of cutting teeth each comprising an arcuate front cutting edge and a back edge;
   each of said seats receiving therein a corresponding associated cutting tooth therein such that said front cutting edge of each cutting tooth faces in an outwardly direction from said leading edge of said plate; and
   each of said cutting teeth being coupled to said plate in the associated seat;
   wherein each of said cutting teeth is formed of a material having a relatively greater hardness than a material forming the plate such that the cutting teeth have relatively greater wear resistance than the plate.

2. The cutting blade of claim 1, wherein said plate has a generally triangular configuration.

3. The cutting blade of claim 1, wherein said side edge of said plate has a generally rectangular U-shaped cutout therein forming a side seat, wherein said side cutout receives a cutting tooth therein.

4. The cutting blade of claim 1, wherein said plate has a rounded first corner connecting said leading edge and said back edge of said plate together, and wherein said plate has a rounded second corner connecting said side edge and said back edge of said plate together.

5. The cutting blade of claim 4, wherein said rounded second corner of said plate has a radius of curvature greater than a radius of curvature of said rounded first corner of said plate.

6. The cutting blade of claim 1, wherein said plate has a spaced apart pair of mounting holes therethrough.

7. The cutting blade of claim 1, wherein said extents are spaced apart at generally equal intervals in said row along said leading edge of said plate.

8. The cutting blade of claim 1, wherein each of said seats has a generally rectangular U-shaped periphery comprising a spaced apart pair of side portions and a back portion connecting said side portion of the respective seat together, wherein said side portions of each seat are extended generally perpendicular to said back portion of the respective seat.

9. The cutting blade of claim 8, wherein each of said cutting teeth has a pair of opposite ends, wherein said back edge of each cutting tooth is coupled to said back portion of the associated seat, wherein one of said ends of each cutting tooth is coupled to one of said side portions of the associated seat, and wherein the other end of each cutting tooth is coupled to the other of said side portions of the associated seat.

10. The cutting blade of claim 9, wherein a weld couples said back edge and ends of each cutting tooth to the corresponding back and side portions of the associated seat.

11. The cutting blade of claim 9, wherein brazing couples said back edge and ends of each cutting tooth to the corresponding back and side portions of the associated seat.

12. The cutting blade of claim 9, wherein each of said ends of each cutting tooth has a rounded corner adjacent said back edge of the respective cutting tooth.

13. The cutting blade of claim 1, wherein a weld couples each cutting tooth to the associated seat.

14. The cutting blade of claim 1, wherein brazing couples each cutting tooth to the associated seat.

15. The cutting blade of claim 1, wherein said front cutting edge of each cutting tooth has an outwardly facing convexity facing outwards in a direction from said leading edge of said plate, wherein said front cutting edge of each cutting tooth is extended at an acute angle from a first face of the respective cutting tooth and an obtuse angle from a second face of the respective cutting tooth.

16. The cutting blade of claim 15, wherein said acute angle of said front cutting edge of each cutting tooth is about 45 degrees, and wherein said wherein said obtuse angle of said front cutting edge of each cutting tooth is about 135 degrees.

17. The cutting blade of claim 15, wherein said front cutting edge of each cutting tooth has an outermost apex located adjacent said first face of the respective cutting edge, and wherein said apexes of said front cutting edges of said cutting teeth define an arc being generally uniformly spaced apart from said leading edge of said plate.

18. The cutting blade of claim 1 wherein each of said cutting teeth has a thickness and said plate has a thickness, and said thickness of each cutting tooth is about equal to said thickness of said plate.

19. The cutting blade of claim 1 wherein each of said cutting teeth has a width defined between a back edge and an outermost apex of said front cutting edge; and a length defined between ends of the respective cutting tooth and a width, wherein said length of each cutting tooth is at least about three times said width of the respective cutting tooth.

20. A cutting blade for an auger rotatably mounted in a mixing bin of an agricultural mixer, said auger having a corkscrew shaped fin and a plurality of said cutting blades mounted to an outer periphery of said fin in a spaced relationship along the length of said auger, each of said cutting blades comprising:

a generally triangular substantially planar plate having a pair of substantially parallel and substantially planar faces, a generally arcuate leading edge, a generally straight back edge, and a generally straight side edge extending between said leading edge and said back edge of said plate;

said plate having a rounded first corner connecting said leading edge and said back edge of said plate together, said plate having a rounded second corner connecting said side edge and said back edge of said plate together;

said rounded second corner of said plate having a radius of curvature greater than a radius of curvature of said rounded first corner of said plate;

said plate having a spaced apart pair of mounting holes therethrough extending between said faces of said plate, said mounting holes having a generally oblong outer perimeter, wherein said mounting holes each have a beveled generally circular outer perimeter;

said mounting holes of said plate each being adapted for extending a fastener therethrough to mount said plate to a portion of a corkscrew-shaped fin of an auger such that said leading edge of said plate facing radially outwards from an outer perimeter of the fin of the auger;

said leading edge of said plate having an outwardly facing convexity;

said leading edge of said plate having a plurality of spaced apart generally rectangular U-shaped cutouts therein forming a row of alternating seats and extents extending along said leading edge of said plate between said side edge and said first corner of said plate, said row of alternating seats and extents terminating at an extent at both ends of said row so that an extent is positioned adjacent said side edge of said plate and another extent is positioned adjacent said first corner of said plate;

wherein said extents are spaced apart at generally equal intervals in said row along said leading edge of said plate;

each of said seats having a generally rectangular U-shaped periphery comprising a spaced apart pair of side portions and a back portion connecting said side portion of the respective seat together;

said side portions of each seat being extended generally perpendicular to said back portion of the respective seat;

each of said seats having a width defined between said side portions of the respective seat and a depth defined outwardly from said back portion;

wherein said widths said seats are about equal to one another, wherein depths of said seats are about equal to one another;

wherein said width of each seat is at least about thirteen times said depth of the respective seat;

a plurality of cutting teeth each comprising a pair of substantially parallel and substantially planar faces, a pair of opposite ends, and an arcuate front cutting edge and a substantially straight back edge extending between said ends of the respective cutting tooth;

each of said seats receiving therein a corresponding associated cutting tooth therein;

one of said faces of each cutting tooth being generally coplanar with one of said faces of said plate, the other face of each cutting tooth being generally coplanar with the other face of said plate;

said back edge of each cutting tooth being coupled to said back portion of the associated seat, one of said ends of each cutting tooth being coupled to one of said side portions of the associated seat, the other end of each cutting tooth being coupled to the other of said side portions of the associated seat;

wherein a weld couples said back edge and ends of each cutting tooth to the corresponding back and side portions of the associated seat;

wherein brazing couples said back edge and ends of each cutting tooth to the corresponding back and side portions of the associated seat;

said back edge of each cutting tooth being extended substantially perpendicular to said faces of the respective cutting tooth;

said ends of each cutting tooth being extended generally perpendicular to said back cutting edge of the respective cutting tooth;

each of said ends of each cutting tooth having a rounded corner adjacent said back edge of the respective cutting tooth;

said front cutting edge of each cutting tooth having an outwardly facing convexity facing outwards in a direction from said leading edge of said plate;

said front cutting edge of each cutting tooth being extended at an acute angle from a first of said faces of the respective cutting tooth and an obtuse angle from a second of said faces of the respective cutting tooth;

said front cutting edge of each cutting tooth having an outermost apex located adjacent said first face of the respective cutting edge;

said apexes of said front cutting edges of said cutting teeth defining an arc being generally uniformly spaced apart from said leading edge of said plate;

each of said cutting teeth having a thickness defined between said faces of the respective cutting tooth, a length defined between said ends of the respective cutting tooth and a width defined between said back edge and an outermost apex of said front cutting edge adjacent said first face of the respective cutting edge;

each of said cutting teeth being of generally equal size;

wherein said thickness of each cutting tooth is about equal to said thickness of said plate;

wherein said length of each cutting tooth is at least about three times said width of the respective cutting tooth; and wherein each of said cutting teeth comprises a material having a hardness greater than the material of said plate.

21. A cutting blade, comprising:

a plate having a leading edge, a back edge and a side edge extending between the leading edge and back edge;

said leading edge of said plate having a plurality of spaced apart cutouts therein forming a row of alternating seats and extents extending along said leading edge of said plate;

a plurality of cutting teeth each comprising an arcuate front cutting edge and a back edge, each of said seats receiving therein a corresponding associated cutting tooth therein such that said front cutting edge of each cutting tooth faces in an outwardly direction from said leading edge of said plate; and each of said cutting teeth being coupled to said plate in the associated seat;

wherein each of the front cutting edges of said cutting teeth are convex such that a middle portion of said front cutting edge projects relatively further outward from said plate than end portions of said front cutting edge.

22. The cutting blade of claim 21, wherein said extents are spaced apart at generally equal intervals in said row along said leading edge of said plate.

23. The cutting blade of claim 21, wherein each of said seats has a generally rectangular U-shaped periphery comprising a spaced apart pair of side portions and a back portion connecting said side portion of the respective seat together, wherein said side portions of each seat are extended generally perpendicular to said back portion of the respective seat.

24. The cutting blade of claim 23, wherein each of said cutting teeth has a pair of opposite ends, wherein said back edge of each cutting tooth is coupled to said back portion of the associated seat, wherein one of said ends of each cutting tooth is coupled to one of said side portions of the associated seat, and wherein the other end of each cutting tooth is coupled to the other of said side portions of the associated seat.

25. The cutting blade of claim 24, wherein brazing couples said back edge and ends of each cutting tooth to the corresponding back and side portions of the associated seat.

26. The cutting blade of claim 24, wherein each of said ends of each cutting tooth has a rounded corner adjacent said back edge of the respective cutting tooth.

27. The cutting blade of claim 21, wherein each of said cutting teeth is formed of a material having a relatively greater hardness than a material forming the plate such that the cutting teeth have relatively greater wear resistance than the plate.

* * * * *